(12) United States Patent
Gernot et al.

(10) Patent No.: US 8,728,181 B2
(45) Date of Patent: *May 20, 2014

(54) STAGED SYSTEM FOR PRODUCING PURIFIED HYDROGEN FROM A REACTION GAS MIXTURE COMPRISING A HYDROCARBON COMPOUND

(75) Inventors: Eric Gernot, Atony (FR); Arnaud Deschamps, Palaiseau (FR)

(73) Assignee: Compagnie Europeenne des Technologies de l'Hydrogene (C.E.T.H.), Marcoussis (FR)

( * ) Notice: Subject to any disclaimer, the term of this patent is extended or adjusted under 35 U.S.C. 154(b) by 310 days.

This patent is subject to a terminal disclaimer.

(21) Appl. No.: 13/009,293

(22) Filed: Jan. 19, 2011

(65) Prior Publication Data

US 2011/0176970 A1 Jul. 21, 2011

Related U.S. Application Data

(63) Continuation of application No. 11/659,493, filed as application No. PCT/FR2005/001986 on Jul. 28, 2005, now Pat. No. 7,938,868.

(30) Foreign Application Priority Data

Aug. 6, 2004 (FR) ...................................... 04 08731

(51) Int. Cl.
*B01J 7/00* (2006.01)

(52) U.S. Cl.
USPC ............ 48/61; 48/127.9; 48/127.1; 48/118.5; 48/128; 48/198.7; 48/198.3; 48/119; 422/188; 422/189; 422/211; 422/222; 422/236; 422/190; 422/191; 423/650; 423/652; 423/248; 429/19; 429/20; 60/780; 95/55; 95/56; 96/4; 96/7; 96/8; 96/9; 96/10; 96/11

(58) Field of Classification Search
USPC .................. 422/187, 198, 202; 48/61, 76, 75, 48/127.9, 128, 198.3, 198.7; 423/248; 96/4

See application file for complete search history.

(56) References Cited

U.S. PATENT DOCUMENTS

| | | | |
|---|---|---|---|
| 3,241,293 A | 3/1966 | Pfefferle | |
| 3,534,531 A | 10/1970 | Eguchi et al. | |
| 3,854,904 A | 12/1974 | Jamet et al. | |
| 5,674,301 A | 10/1997 | Sakai et al. | |
| 6,348,278 B1 | 2/2002 | LaPierre et al. | |
| 6,896,709 B1 * | 5/2005 | Han et al. ..................... | 48/127.9 |
| 6,913,736 B2 | 7/2005 | Alvin et al. | |

FOREIGN PATENT DOCUMENTS

| | | |
|---|---|---|
| DE | 12 57 756 B | 1/1968 |
| EP | 0 783 919 A1 | 7/1997 |
| GB | 1 256 153 A | 12/1971 |
| WO | 00/27507 A1 | 5/2000 |

* cited by examiner

*Primary Examiner* — Kaity V. Handal
(74) *Attorney, Agent, or Firm* — Browdy and Neimark, PLLC

(57) ABSTRACT

The inventive stage system for producing hydrogen consists of at least two upstream/downstream stages, respectively, each of which comprises, optionally, a catalytic reactor ($C_1$ to $C_5$) followed by a separator comprising a space ($E1$ to $E4$) for circulation of a gaseous mixture contacting at least one oxygen extracting membrane and a hydrogen collecting space, wherein the reactor ($C_1$) of the upstream stage is connected to a reaction gaseous mixture source, the circulation stage ($E_1$) of the upstream stage separator is connected to the reactor ($C_2$) of the downstream stage and the spaces for extracting/collecting oxygen from two separators are connected to a hydrogen collecting circuit (TC, 8) which is common for two stages.

9 Claims, 2 Drawing Sheets

STAGED SYSTEM FOR PRODUCING PURIFIED HYDROGEN FROM A REACTION GAS MIXTURE COMPRISING A HYDROCARBON COMPOUND

CROSS-REFERENCE TO RELATED APPLICATIONS

The present application is a continuation of application Ser. No. 11/659,493, filed Jan. 23, 2008, now U.S. Pat. No. 7,938,868, which is a 371 national stage of PCT/FR05/01986, filed Jul. 28, 2005, which claims priority to French application no. 04 08731, filed Aug. 6, 2004. The entire contents of these applications are incorporated herein by reference.

The present invention relates to a staged system for producing purified hydrogen, from a reaction gas mixture comprising a hydrocarbon compound, such as for example an alcohol or synthesis gas containing carbon monoxide.

Generally, it is known that purified hydrogen is used in the manufacturing of many products, such as metals, semiconductors, and microelectronics. It is also an important source of fuel for many energy conversion systems. For example, fuel cells use hydrogen and an oxidizer for producing an electric potential. Various methods may be used for producing hydrogen. One of them is the steaming of hydrocarbon feeds.

In order to produce purified hydrogen, systems which involve a reactor comprising a catalytic area for producing hydrogen have already been proposed, wherein a hydrocarbon feed reacts with steam forming a gas mixture rich in hydrogen. Selected extraction of the hydrogen contained in this mixture is achieved by specially designed membranes for separating hydrogen from the other gas components of the mixture.

The solutions proposed up to now are of the continuous type and usually apply a device (membrane) for separating hydrogen, positioned along the gas flow in the catalytic area. Thus, the gas reacts and hydrogen is permanently extracted along the reactor, as soon as it is formed and reaches the separation device.

It is found that these solutions have the following drawbacks, even in the case when the reactor is made in several sections:

The catalyst should be placed in the intimate vicinity of the membrane, otherwise mass transfer of hydrogen towards said membrane may be limiting.

The constitutive materials of the catalyst and of the separator should therefore be compatible.

The filtration device should be sufficiently fast, i.e., having sufficient flux, so that extraction of hydrogen has a large influence on the gas composition at each location. If it is too fast, then a certain portion of its surface will only see very little flow because the partial pressure of hydrogen upstream will be kept at a low level.

If the catalyst is too fast, then equilibrium is achieved as soon as the gas enters the reactor, the following section sees the extraction of hydrogen and the change in the gas composition. The catalyst is useless there. As soon as the composition has sufficiently changed, the catalyst resumes its utility for achieving a new equilibrium corresponding to the entry parameters in the third section, and so forth.

The two following cases are summarized in the following way:

Either the hydrogen fraction in the reactor is constantly low because of the rapidity of the membrane, but then the flux flowing through is low. The membrane is under-utilized.

Or the catalyst is fast and acts intermittently with surges, waiting for the hydrogen composition to be depleted. Consequently, large catalytic areas are useless. The catalyst is under-utilized.

The design of such systems should be investigated in detail in order to achieve significant performances in terms of compactness and cost, and the parameters which may be acted upon, remain few (amount of catalyst per reactor unit length, size of the channels).

More particularly, but not exclusively, the object of the invention is to suppress these drawbacks.

For this purpose it proposes a system for producing purified hydrogen comprising at least two respectively upstream/downstream stages, each including a reactor, optionally a catalytic reactor, followed by a separator including a space for letting the gas mixture flow into contact with at least one hydrogen extraction membrane, and a space for collecting hydrogen, the upstream stage reactor being connected to a source of reaction gas mixture, the flow space of the separator of the upstream stage being connected to the reactor of the downstream stage while the hydrogen extraction/collection spaces of both separators are connected to a hydrogen collecting circuit common to both stages.

By means of this arrangement, the reaction gas mixture successively encounters the reaction and separation areas so that hydrogen is extracted from the reaction mixture before the end of the reactions, thereby preventing it from reacting in reverse reactions for producing methane (these reactions being inevitable without hydrogen extraction).

Moreover, this design is particularly adapted to the use of separation membranes with planar geometries. Advantageously, these separation membranes may comprise a composite metal structure including a porous support with large porosity, an intermediate layer with lower porosity and a thin dense layer of a palladium alloy selectively permeable to hydrogen.

In the system according to the invention, by successively performing the reaction steps and then the separation steps, the expected improvement may be achieved in a membrane reactor, with the following well-known advantages:

the separation device and the catalyst are not in intimate contact, the flow of the fluids may be investigated in the catalytic and separation areas separately, heat exchangers may be installed in the vicinity of the endothermic or exothermic catalytic areas, the compartment may be dimensioned separately in order to obtain the best separation rate/catalysis rate ratio, depending on the catalytic load, if need be, additional catalytic areas of the same design may be added or removed in order to achieve this optimum, the catalyst may be easily renewed, upstream/downstream separation is guaranteed by a fully welded assembly, different catalysts may be used on the same system.

An embodiment of the invention will be described hereafter, as a non-limiting example, with reference to the appended drawings wherein.

Figure 1:
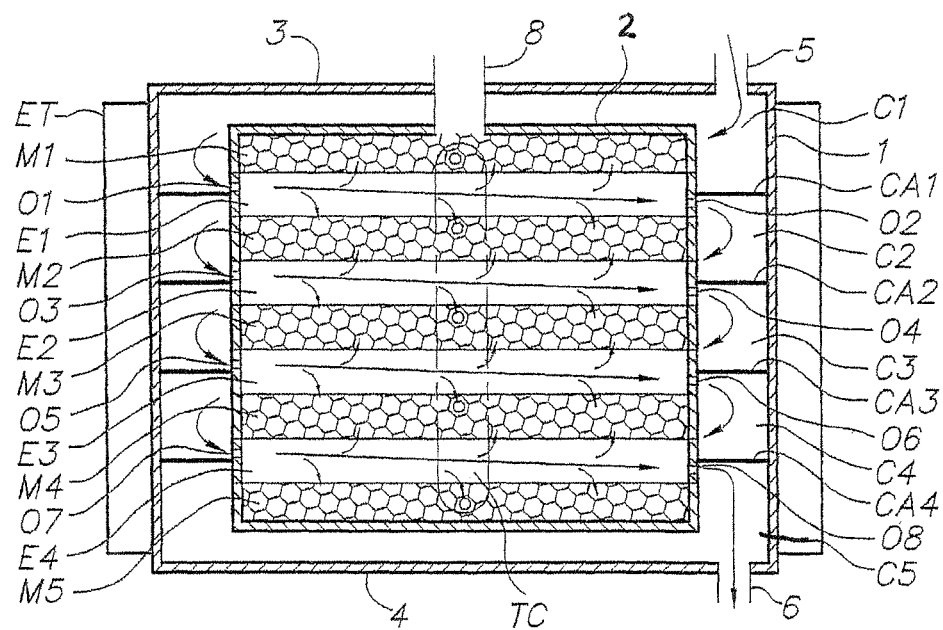
FIGS. 1 and 2 are two schematic axial sectional views, at 90° from each other, of a staged system for producing hydrogen according to the invention.

In this example, the system according to the invention involves two coaxial cylindrical enclosures 1, 2, i.e.:

an outer enclosure 1 closed by two radial walls 3, 4, respectively provided with a port for admitting a reaction gas mixture 5 and with a discharge conduit 6 for the hydrogen-depleted synthesis gas, and an inner enclosure 2 with a smaller diameter, one of both radial walls of which is provided with a substantially coaxial conduit for collecting purified hydrogen 8, which sealably crosses the corresponding radial wall 3 of the outer enclosure 1.

Enclosure 1 delimits with enclosure 2 an intermediate space divided into a plurality of annular compartments $C_1$-$C_5$ (five compartments here) by annular partitions (four partitions $CA_1$-$CA_4$ here). These compartments $C_1$-$C_5$ are chemical reactors and comprise one or more catalysts specific to the sought-after reforming reaction. These catalysts are selected according to the feed to be converted into hydrogen. They may exclusively consist in a fixed bed of catalysts, in the various encountered forms (granules, monoliths, etc.).

The inner enclosure 2 is itself divided into a plurality of circular compartments (four compartments $E_1$-$E_4$ here) via hydrogen separation modules in the form of radial disks (five modules $M_1$-$M_5$ here). The circular compartments $E_1$-$E_4$ are spaces in which the gas mixture flows.

The separation modules $M_1$-$M_5$ are substantially staggered relatively to the corresponding consecutive annular partitions $CA_1$-$CA_4$.

Each of the cylindrical compartments $E_1$-$E_4$ communicates through two opposite ports $O_1$-$O_8$ provided in the inner enclosure, with two consecutive annular compartments $C_1$-$C_5$ (upstream and downstream, respectively).

The separation modules $M_1$-$M_5$ communicate through ports $O_{10}$-$O_{14}$ provided in the cylindrical wall of the inner enclosure 2, with a manifold TC for collecting purified hydrogen. The separation modules each comprise a plurality of membrane separation components which may preferably consist in palladium or palladium alloy membranes, obtained either by depositing the alloy on a porous support with an expansion coefficient close to that of palladium and involving a physical ("Physical Vapor Deposition" (PVD)) or chemical (Chemical Vapor Deposition" (CVD)) technique, electrolysis, an adequate electroless process or by assembling laminated sheets of the alloy, assembled so as to rest on an open support, preferentially in a porous material, but which may also consist in a stack of gridded metal sheets with different apertures and capable of allowing said sheet to withstand the pressure difference between the upstream area (reaction gas mixture flow) and the downstream area (circuit for collecting purified hydrogen).

For this purpose, the laminated sheets may be assembled by high energy welding between two constitutive parts of the separator (for example, such as described in Patent Application FR No. 03 09812 of Aug. 11, 2003, filed in the name of the Applicant) by welding, diffusion or brazing.

Figure 2:
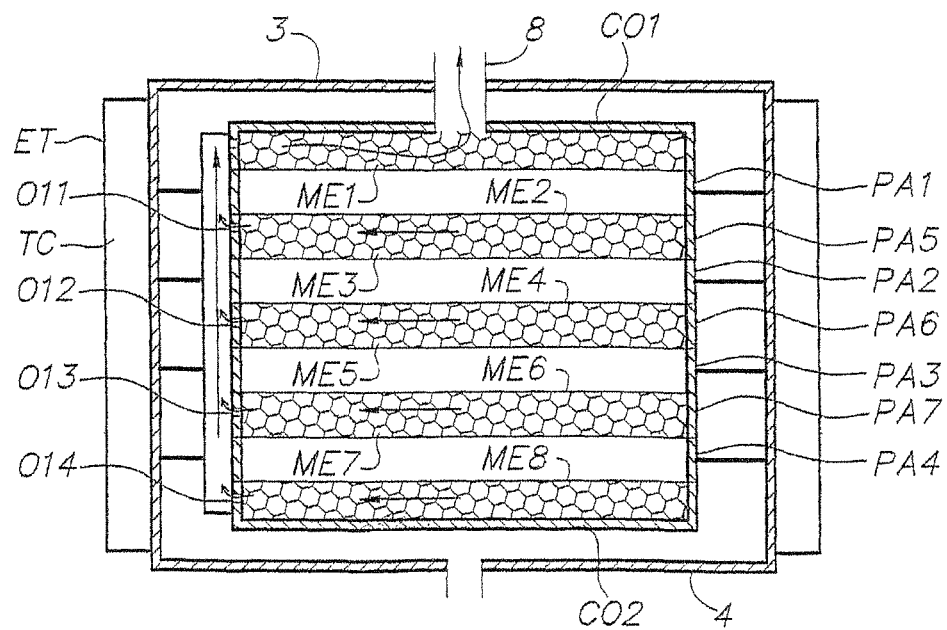

Advantageously, the assembly comprising the inner enclosure 2 and the separation modules is formed, as illustrated in FIGS. 1 and 2, by a stack of welded mechanical parts, i.e., alternately:

annular parts $PA_1$-$PA_4$ which maintain the gap between the separation modules $M_1$-$M_5$, support the annular partitions $CA_1$-$CA_4$ and which comprise the ports $O_1$-$O_8$ so as to provide distribution of the fluid to the surface of the membranes $ME_1$-$ME_8$, and annular parts $PA_5$-$PA_7$ which form the peripheral edge of the separation modules and on which the membranes are welded, these annular parts $PA_1$-$PA_7$ are provided with ports $O_{11}$ and $O_{13}$.

In this example, the tubular wall of the inner enclosure 2 made by assembling the annular parts $PA_1$-$PA_7$ is closed by lids $CO_1$ and $CO_2$ accommodating the separation modules $M_1$ and $M_5$.

A mixing device may be used for reducing the thickness of the limiting layer for mass transfer between the gas and the separation surfaces, by generating turbulent flow. Such a device may be formed by a metal foam disc inserted into the gas passage port $O_1$-$O_8$ in the annular parts $PA_1$-$PA_4$ or by a bed of beads either catalytic or not.

The device described earlier then operates as follows:

The reaction gas mixture which penetrates into the enclosure 1 through the admission port enters the first annular compartment $C_1$, where it undergoes a catalytic reaction and is therefore partially converted into hydrogen. Inside this first compartment $C_4$, the mixture flows around the inner enclosure 2 in order to reach the port $O_1$ thereby being forced to flow over the whole catalytic area of this first compartment $C_1$.

This (catalytic here) reaction area which generates a reforming process, operates at a temperature from 200° C. to 800° C. by optional catalytic components adapted to the selected hydrocarbon or alcohol feed.

Via port $O_1$, the hydrogen-rich mixture enters and flows into the first circular compartment $E_1$, where it is in contact with the membranes $ME_1$, $ME_2$ of both separation modules $M_1$, $M_2$ which delimit this compartment. The hydrogen extracted through the membranes of both of these modules, flows through the porous membrane supports and is collected by the collecting manifold TC via ports $O_{10}$ and $O_{11}$.

Advantageously, a reaction mixture flow system may be provided at the surface of the membranes $ME_1$-$ME_8$. This system may comprise a set of baffles, channels or microchannels, or even of any distribution components contributing to distribution of the mixture at the surface of the membranes $ME_1$-$ME_8$.

The hydrogen-depleted gas mixture which flows out of the first circular compartment $E_1$ through port $O_2$ enters the second annular compartment $C_2$, in which it again undergoes a catalytic reaction and is again enriched in hydrogen. It flows around the inner enclosure before penetrating into the second circular compartment $C_2$ (through port $O_3$) where it undergoes a new separation process.

This process is repeated until the hydrogen-depleted gas mixture flows out of the last circular compartment $C_5$ via port $O_8$. It is then discharged through the discharge conduit 6, for example towards a post-processing system which may either comprise a catalytic burner or not.

Taking into account the fact that the purpose of this device is to produce ultra pure 99.99% (preferentially 99.99999%) hydrogen, the separation system with which the circular compartments $E_1$-$E_4$ are equipped, comprises membranes consisting of a layer with a small thickness (a few μm) of palladium alloy (Pd—Ag, Pd—Cu, Pd—Ni) or any other dense palladium metal alloy selectively permeable to hydrogen, of a porous metal layer providing support to the dense layer and providing sufficient porosity so as not to generate any significant pressure drop upon the passage of pure hydrogen, and of a porous metal layer with large porosity.

Separation of hydrogen occurs with temperature and under the effect of the partial pressure gradient between the upstream side (pressure in the circular compartments $E_1$-$E_5$) and the downstream side of the dense palladium alloy layer of the membrane (pressure inside the separation modules). This layer should therefore withstand a large pressure difference, leading it to being placed on the composite structure described above.

It will be noted that in the example described earlier, the seal between two consecutive annular compartments $C_1$-$C_5$, which is achieved by the annular partitions $CA_1$-$CA_4$, is not necessarily complete. Indeed, a leak of reaction gas mixture may be tolerated from one compartment to the other as long as it remains negligible as compared with the nominal flow rate.

The invention is of course, not limited to the embodiment described earlier.

Figure 3:
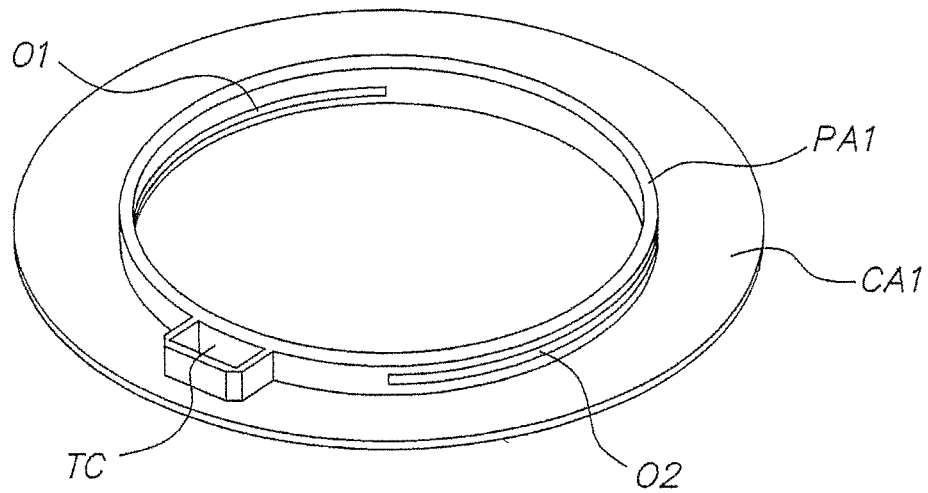
FIG. 3 is a perspective view of an annular partition used for providing separation of the reactors.

Thus, for example, the annular partitions $CA_1$-$CA_4$ may each be made in a single piece with corresponding annular parts PA-$PA_4$, as well as a section of the pure hydrogen collecting manifold TC (FIG. 3).

In this example, the ports provided on the annular parts consist in circular slots positioned above and below the annular partition, respectively.

Also, according to another alternative embodiment, the annular partitions $CA_1$-$CA_4$ may be made by assembling annular plates obtained by cutting them out.

Figure 4:
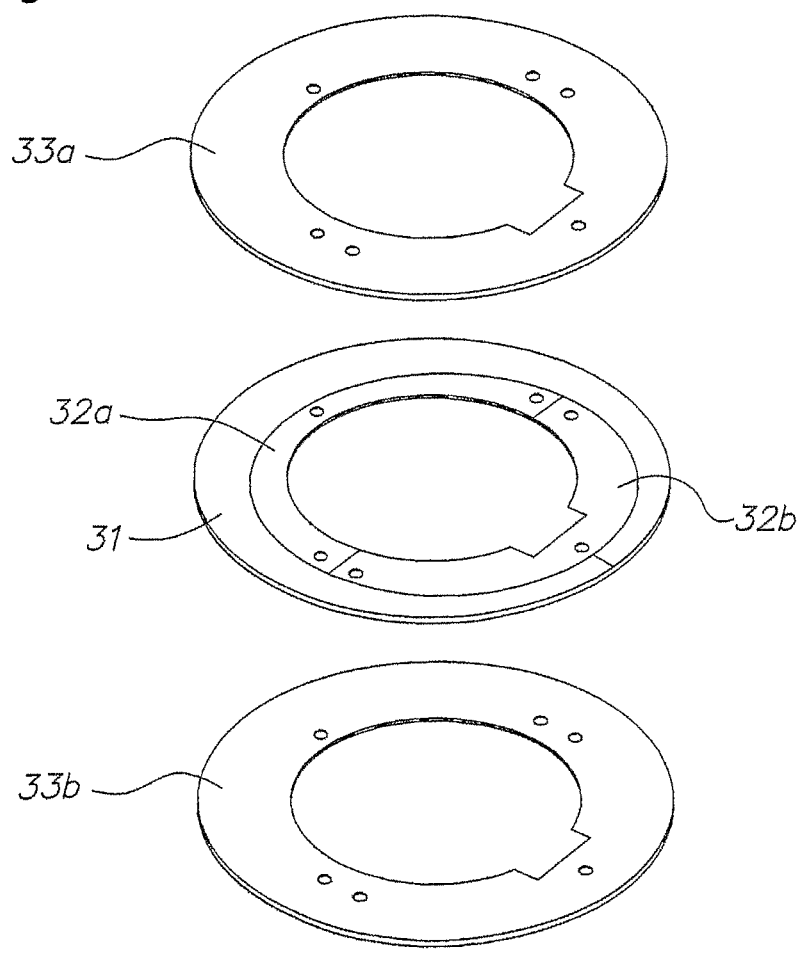
FIG. 4 is a perspective exploded view, showing the plates and the counter-plates which form an annular separation partition according to an alternative embodiment of the invention.

Thus, for example, as illustrated in FIG. 4, this assembly may involve two counter-plates 32A, 32B, as half crowns, which will be inserted into the groove provided in the corresponding annular part $PA_1$-$PA_4$. For a better seal, these parts may be brazed or stuck to the part $PA_1$-$PA_4$. Both of these counter-plates 32a, 32b are held clamped between two crown-shaped plates 33a, 33b, so as to obtain a solid, screwed or welded assembly which forms the annular partition. Both of these plates 33a, 33b are further used for holding an intermediate gasket 31 which will be pressed against the outer enclosure 1 in order to provide a seal between both annular compartments separated by the partition.

In the example illustrated in FIGS. 1 and 2, a heat exchanger ET surrounding the cylindrical wall of the outer enclosure 1 is illustrated schematically.

This heat exchanger ET may, according to the (exothermic or endothermic) nature of the catalytic reaction, consist in a cooling system by absorption of calories by means of a heat transfer fluid which may be used in a heating circuit or conversely in a heat generator.

An advantage of the solution described earlier consists in its modularity which provides it with very high flexibility. Indeed, each assembly comprising a couple of annular parts $PA_2$-$PA_5$, an annular partition $CA_2$, and a separation module M2 forms an elementary cell which may be discarded in order to obtain a functional assembly meeting specifications.

Moreover, it is seen that, in this system, the pure hydrogen network connects all the downstream portions of the separation membranes. Except for the separation membranes, it forms an enclosure which is totally sealed off from the other areas of the system, so as to retain the purity of hydrogen until it is delivered. This network is dimensioned so as to reduce the pressure loss between the separation membrane and the "pure hydrogen" outlet of the system.

The invention claimed is:

1. A system for producing hydrogen from a gas mixture, comprising a gas input, at least a first and a second stage and a hydrogen collecting circuit, wherein each of said stages comprises:
  a stage inlet, a reactor, a separator, a stage outlet and a collector,
  said stage inlet being connected to said reactor to provide gas mixture, and said reactor outputting a purified mixture comprising hydrogen and remaining gas mixture to said separator,
  said separator comprising a flow space for circulating said purified mixture to said stage outlet, said separator further comprising at least one hydrogen extraction membrane contacting said flow space for extracting hydrogen from said purified mixture,
  said collector being arranged for collecting purified hydrogen from said at least one hydrogen extraction membrane, said collector being connected to said hydrogen collecting circuit,
  said at least first and second stages being arranged in series with respect to the gas mixture flow direction, the stage inlet of the first stage being connected to said gas input, and the stage outlet of the first stage being connected to the stage inlet of the second stage;
  further comprising two coaxial enclosures which delimit between them an intermediate space divided by annular partitions into a plurality of annular compartments which form said reactors, the inner enclosure comprising hydrogen separation modules forming said hydrogen extraction membranes, said hydrogen separation modules being respectively positioned between couples of corresponding consecutive annular partitions and defining a plurality of gas mixture flow compartments forming said flow spaces, each of the flow compartments communicating via two opposite ports provided in the inner enclosures with two consecutive annular compartments.

2. The system according to claim 1, wherein the separation modules communicate via ports provided in the cylindrical wall of the inner enclosure, with a manifold for collecting purified hydrogen.

3. The system according to claim 2, wherein the separation modules each comprise a plurality of membrane separation components.

4. The system according to claim 1, wherein the assembly comprising the inner enclosure and the hydrogen separation modules comprises an alternating stack of annular parts which maintain the gap between the hydrogen separation modules which support the annular partitions for separating the reactors and which comprise ports for communicating with the gas mixture flow compartments and annular parts which form the peripheral edge of the hydrogen separation modules and on which the membranes are welded, these annular parts comprising hydrogen discharge ports opening into said hydrogen collecting manifold.

5. The system according to claim 4, wherein the seal achieved by the annular partitions between two consecutive annular compartments is not complete.

6. The system according to claim 4, the annular partitions are made in a single piece with the corresponding annular parts and with a hydrogen collecting manifold section.

7. The system according to claim 6, wherein the ports provided on the aforesaid annular part consist in circular slots respectively positioned above and below the annular partition.

8. The system according to claim 4, wherein the annular partitions are made by assembling two counter-plates as a half crown, which will be sealably inserted in a groove provided in the corresponding annular part, both of these counter-plates being clamped between two crown-shaped plates.

9. The system according to claim 8, wherein an intermediate gasket is positioned between both plates.

\* \* \* \* \*